United States Patent [19]

Schaffner

[11] 4,456,516
[45] Jun. 26, 1984

[54] SHAFT ROUNDING APPARATUS

[75] Inventor: Alfred C. Schaffner, Los Gatos, Calif.

[73] Assignee: Westinghouse Electric Corp., Pittsburgh, Pa.

[21] Appl. No.: 493,897

[22] Filed: May 12, 1983

[51] Int. Cl.³ .......................... C25F 7/00; C25F 3/14; B24B 33/04; B24B 49/04
[52] U.S. Cl. .............................. 204/217; 204/224 M; 204/129.25; 204/129.5; 51/165.83
[58] Field of Search ..................... 51/165.83, 165.91; 204/129.2, 129.25, 129.5, 217, 224 M, DIG. 12, 225

[56] References Cited

U.S. PATENT DOCUMENTS

| | | | |
|---|---|---|---|
| 2,243,578 | 5/1941 | Reardon | 148/6 |
| 2,293,951 | 8/1942 | Seastone et al. | 175/21 |
| 2,590,927 | 4/1952 | Brandt et al. | 204/56 |
| 2,603,043 | 7/1952 | Bontemps | 51/165.91 |
| 3,058,895 | 10/1962 | Williams | 204/143 |
| 3,157,971 | 11/1964 | Snyder | 51/165.91 |
| 3,365,381 | 1/1968 | Fromson | 204/143 |
| 3,591,473 | 7/1971 | Haggerty | 204/224 M X |
| 3,603,044 | 9/1971 | Price | 51/165.91 |
| 3,616,347 | 10/1971 | Haggerty | 204/217 X |
| 3,694,340 | 9/1972 | Takahashi | 204/224 M |
| 3,694,970 | 10/1972 | Schoonover et al. | 51/165.91 |
| 4,036,607 | 7/1977 | Freddi | 51/165.91 |

FOREIGN PATENT DOCUMENTS 46-25677 7/1971 Japan ................. 204/129.2

Primary Examiner—Howard S. Williams
Assistant Examiner—T. L. Williams
Attorney, Agent, or Firm—G. H. Telfer

[57] ABSTRACT

An apparatus is provided which machines a generally cylindrical shaft in such a way so as to improve its roundness. A bracket is shaped to be slidably associated with the shaft in a two point contact. The bracket has a measuring means attached to it which measures the distance between a portion of the shaft's surface and a chordal line drawn between the two points of contact between the bracket and the shaft. Also provided is a means for electrochemically removing material from the surface of the shaft in response to a signal received from the measuring means which is amplified prior to being transmitted to a cathode portion of the electrochemical machining apparatus. Variations of the roundness machining apparatus incorporate placements of the cathode at various arcuate distances from the measuring means. The cathode is connected in electrical communication with the negative pole of a power supply and the shaft is connected in electrical communication with a positive pole of the power supply and a continuous flow of electrolyte fluid is provided between the cathode and the shaft.

8 Claims, 7 Drawing Figures

SHAFT ROUNDING APPARATUS

BACKGROUND AND SUMMARY OF THE INVENTION

The present invention relates generally to apparatus for machining a cylindrical shaft and, more specifically, to a shaft rounding machine which electrochemically removes material from the shaft in response to a measurement of the distance between a preselected point on the shaft's cylindrical surface and a chordal line which extends between two points on the shaft's surface.

Many applications require rotating equipment to incorporate shafts which meet very stringent noise acceptance criteria. For example, submarine power generating machinery must have exceptionally round bearing journals in order to satisfy very strict noise standards. In these types of applications, roundness is sometimes required to be better than 50 millionths of an inch, defined as the maximum allowable deviation from a perfect circle.

In common practice, roundness is achieved by first grinding the journal slightly oversize and inspecting it for roundness or deviation therefrom. Correction of this deviation is obtained by employing the process of superfinishing. The process of superfinishing was developed prior to 1940 and was originally conceived as a means of achieving a superior surface finish and not primarily as a means of rounding shafts. Superfinishing is a very slow and tedious manufacturing method and requires a considerably high level of operator expertise. Since this process involves removal of metal from the total surface, with more being removed from the deviating high points, the possibility exists for machining the journal undersized prior to achieving acceptable roundness.

There has been a great deal of development work done in the field of electrochemical deburring and machining. U.S. Pat. No. 2,590,927 was issued to Brandt et al. on Apr. 1, 1952 and describes an electrolytic method for removing the burrs from the cut edges of laminated cores. This method described in the Brandt patent utilizes phosphoric acid in conjunction with an electrical current to render the phosphoric acid active for the intended purposes of removing the above-mentioned metallic slivers and burrs. By electrically connecting the laminated core to the positive terminal of a direct current power source and disposing a negatively connected cathode proximate and machined surface, an electrical current can be passed through the electrolyte between the machined surface and the cathode. Under the influence of the electrical current, both burrs and slivers are etched away from the machined surface when subjected to the phosphoric acid solution. This use of an electrical current in combination with a phosphoric acid solution is an improvement over prior methods which utilize acid alone in the absence of an electric current such as U.S. Pat. No. 2,293,951 which was issued to Seastone et al. on Aug. 25, 1942, which describes a chemical etching operation that utilizes a solution of nitric, hydrochloric or sulfuric acid without the use of an electric current. An alternative method of treatment is described in U.S. Pat. No. 2,243,578 which was issued to Reardon on May 27, 1941 and which subjects the short-circuited laminated core to an acid phosphate treatment.

Electrochemical machining and shaping is also described in U.S. Pat. No. 3,058,895 issued to Williams on Oct. 16, 1962, and in U.S. Pat. No. 3,365,381 issued to Fromson on Jan. 23, 1968. The Williams patent describes the shaping and contouring of electrically conductive and electrochemically erodable workpieces and also discloses an apparatus for accomplishing this task. The Fromson patent discloses an apparatus for the electrolytic machining of a workpiece in which an electrode is operated in relation to the workpiece while an electrolyte fluid is passed through a fluid passage. Copending patent application Ser. No. 493,843, filed May 12, 1983 and assigned to present assignee, discloses an electrochemical deburring operation which utilizes a salt solution as its electrolyte.

Electrochemical machining or deburring generally requires the disposition of a cathode proximate the surface to be machined. This cathode is connected in electrical communication with the negative terminal of a direct current power supply and is disposed a preselected distance from the surface which is to be machined. An electrolyte is caused to flow in the gap between the cathode and the component surface and, when the subject component is connected in electrical communication with the positive terminal of a direct current power supply, a current flows between the cathode and the workpiece. This process removes material from the workpiece by causing ions to be depleted from the surface or the workpiece which is most proximate the cathode. Generally, the electrolyte is a fluid acid or salt solution which is caused to flow into the gap between the workpiece and the cathode.

The present invention provides a bracket member which is shaped to provide a two-point contact with the shaft. It should be understood that the use of the term "two-point contact" throughout the specification refers to an association of components in which the bracket and shaft, observed in a radial section view, contact each other at two points. It should be understood that each of these contact points actually describes an axial line which extends along the surface of the shaft. Therefore, the bracket of the present invention actually touches the workpiece shaft along two lines of contact. However, for purposes of describing the present invention, a more precise explanation of the present invention can be achieved by radial cross-section views of the present invention in association with a workpiece shaft and, in this form of two-dimensional presentation, the contact is at two points.

The two points of contact, described above, describe a chordal line therebetween. This chordal line extends through a portion of the shaft workpiece. Attached to the bracket of the present invention, a measuring device extends radially inward toward a preselected point on the cylindrical surface of the shaft. This measuring device can be the type which incorporate a probe that is capable of making contact with the cylindrical surface of the shaft and, by appropriately positioning the probe relative to the two points of contact, the distance between the tip of the probe (i.e. the shaft's surface) and the chordal line can be accurately determined.

The bracket of the present invention is disposed in slidable two-point contact with the shaft and the shaft is permitted to rotate while maintaining contact with the stationary bracket. As the shaft rotates, a succession of points pass under the probe of the measuring device and a number of sequential measurements can therefore be made. It should be understood that the points measured by these sequential measurements all lie on a circumferential line passing around the shaft on its surface. Although each of these points will lie at various positions around the diameter of the shaft, they all lie in a generally identical axial position on the cylindrical surface of the shaft.

The measuring device produces an electrical signal which is analogous to the distance between the point being measured at that particular time and the chordal line described above. By setting the measuring device to an appropriate bias value, the present invention can measure deviations between each of the points and a perfect circle. By setting the above-mentioned bias value to one which produces no electrical signal when a point at the shaft's minimum radius is measured, all measurements of deviation will be relative to that minimum radial dimension. Furthermore, the present invention amplifies this electrical signal and this amplified signal is transmitted to the cathode of an electrochemical machining apparatus. Since the rate of material removal is dependent on the rate of current flow between the cathode and the subject workpiece, variations in the voltage level of the cathode will result in varying rates of metal removal from the workpiece at the location of the cathode. Therefore, the present invention has the capability of selectively machining the high points, or deviations, which extend radially outward from the radius of a perfect circle around the center line of the shaft workpiece.

In order to be effective, the present invention as described above should have the cathode disposed proximate the probe of the measuring device. However, it should be apparent that the measuring device and the cathode can be disposed an arcuate distance from each other if their operation can be coordinated in such a way so as to delay the response of the amplifier a predetermined period of time which is based upon the arcuate distance between the measuring device and the cathode and also as a function of the speed of rotation of the shaft. An alternative method of coordinating the function of these two components is to provide the shaft with a digital resolver which is able to precisely define its rotational position at any instant in time. Then, by storing the measured values along with the rotational position of the shaft when the value was measured, the signal can later be amplified when that specific location on the shaft is disposed proximate the cathode. In this way, the action of the cathode (i.e. the amplified voltage being supplied to the cathode) can be delayed a variable length of time until the resolver indicates that that particular position on the shaft is coincident with the metal removing means, such as the cathode, and the shaft's material can be removed at precisely the correct spot and at precisely the correct rate.

Many applications of the present invention do not require any additional electronic or computer means for coordinating the operation of the electrochemical machining device and the measuring means. For example, in the case where the electochemical machining device has its cathode positioned at exactly the same place as the measuring device obviously no coordinating system is required. Also, in shafts which have an even number of lobes or deviation high points, the cathode of the electrochemical machining apparatus can be placed an arcuate distance around the shaft which is diametrically opposite from the probe of the measuring device. It has been found that, in shafts with an even number of lobes, the machining of a lobe in response to a measurement of a diametrically opposite lobe is satisfactory for purposes of rounding the shaft. It has also been found that, with shafts having an odd number of lobes, the placement of the cathode at the point of contact between the bracket and the shaft is appropriate for removing high points. In this type of application, the measuring device appears to read a low point because of the fact that a high point is passing under one of the two contact points of the bracket. If the amplified signal from the measuring device is appropriately inverted, the high points or lobes of a three lobed shaft can be adequately rounded with this type of configuration.

The present invention provides an apparatus for removing material from the high points on the cylindrical surface of a shaft and, thus, improving its roundness. It incorporates a means for measuring the distance between a region on the cylindrical surface of the shaft and a reference line which, in the preferred embodiment, is a chordal line drawn between two points of contact which exist between a bracket which holds the measuring device and the workpiece shaft. A metal removing apparatus, such as an electrochemical machining cathode, is disposed proximate the shaft and a flow of electrolyte is provided through the gap which exists between the cathode and the shaft's surface. An electric signal from the measuring device is amplified and supplied to the cathode. By making the electrical signal analogous to the value measured by the measuring device, its amplification can produce an electrial voltage which can be supplied to the cathode and, therefore, the rate of metal removal at the location of the cathode can be directly related to the measurement of the radial deviation of the shaft's surface.

BRIEF DESCRIPTION OF THE DRAWINGS

The present invention will be more completely understood by a reading of the Description of the Preferred Embodiment in conjunction with the drawings in which.

DESCRIPTION OF THE PREFERRED EMBODIMENT

The present invention relates to the machining of a shaft and, more particularly, to an apparatus which permits a shaft to be machined in order to achieve a higher degree of roundness by electrochemically removing material from points of deviation on the shaft's generally cylindrical surface as a function of a measurement of that deviation.

Figure 1:
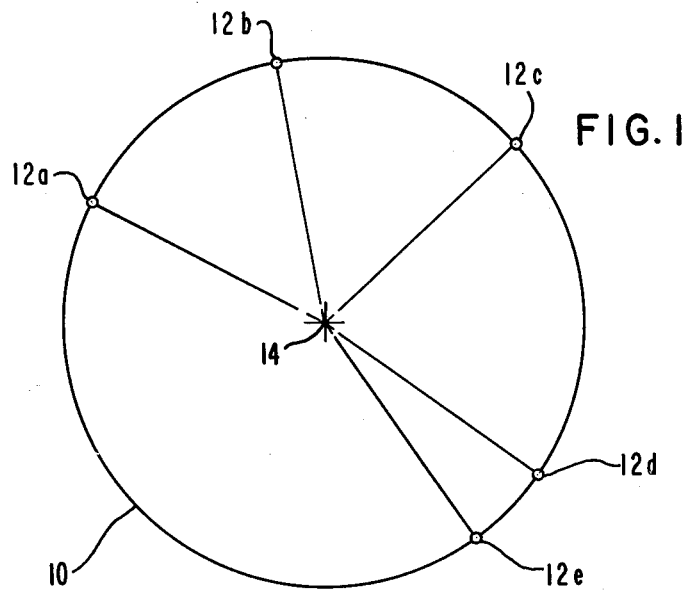
FIG. 1 illustrates a generally circular cross-section of a shaft for the purposes of illustrating the determination of its roundness.

FIG. 1 illustrates a generally circular shape 10 which is representative of a cross-section of a shaft's bearing journal. A part, such as a bearing journal, is generally considered to be "round" in a specific cross-section if a point exists within that cross-section from which all points on the cross-section's periphery are equidistant. For example, in FIG. 1, if all of the points on the circle's periphery (i.e. reference numerals 12a–12e) are equidistant from a single point 14, the shape 10 would be a perfect circle and would be considered perfectly round. When dealing with a cross-sectional shape which is not a perfect circle, but which is generally symmetrical in shape, the out-of-roundness is specified as the difference in distance of points on the periphery from the center 14. If a multiplicity of points on the cross-section's periphery were measured from the shape's center, one accepted definition of roundness would be the absolute magnitude of the difference between the longest and shortest radii. It should be apparent to one skilled in the art that a determination of roundness requires an accurate determination of a center point 14, and in some irregular shapes, this determination may be extremely difficult. It should also be apparent, however, that when a shaft is initially machined to be generally round in shape with minor deviations or high points, removal of these oversized deviations will improve the shaft's roundness.

In nominally round shafts, lobes and undulations or deviations from a circle do actually exist and are by no means mere theoretical concepts. Virtually all machining operations result in some deviations from roundness. The cause of these deviations could be due to defective or worn bearings in a lathe or grinding wheel spindle or to minor deflections in the workpiece itself as the cutting tool exerts a force against it. Shafts which are ground between centers can exhibit deviations from roundness because of improper alignment of the center or because of deflection of the shaft itself. In most machining operations, lobing is particularly difficult to avoid. Compression of the workpiece is very difficult to prevent when a multiple-jaw chuck is used. This type of chuck, which generally has three or more jaws, compresses the workpiece at its points of contact. When the piece is removed from the chuck, these stresses are relieved and, although the workpiece may have been perfectly round while in the machine, its removal can result in three or more lobes in the shaft's cross-section.

Figure 2:
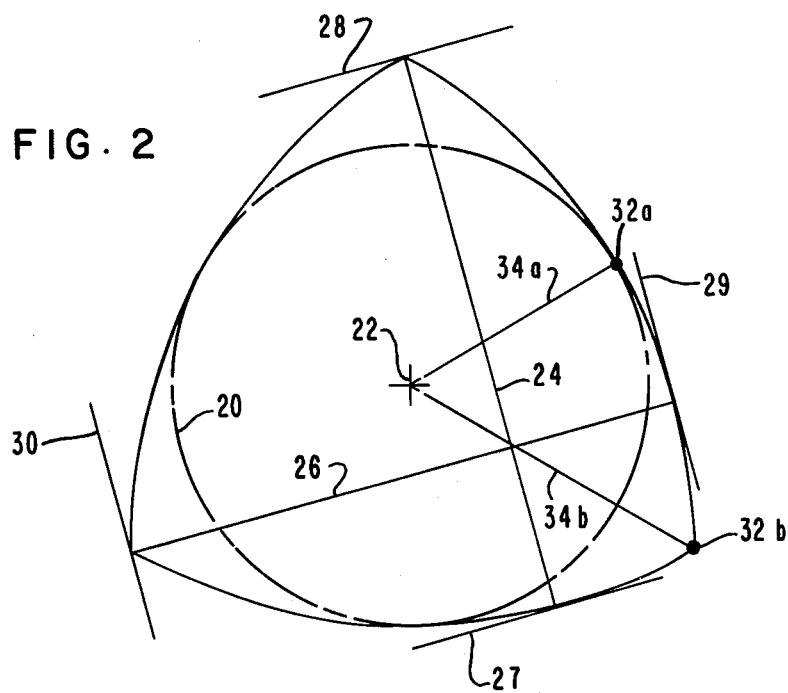
FIG. 2 illustrates a shaft cross-section which is exaggerated to show a three-lobe deviation from roundness condition.

FIG. 2 illustrates a three-lobed deviation from roundness. For purposes of illustration, a perfect circle 20 is shown by a dashed line. This perfect circle 20 comprises a multiplicity of points thereon which are equidistant from a center 22. It should be understood that the shape illustrated in FIG. 2 is an extreme exaggeration of a three-lobed out-of-roundness condition and is illustrated for purposes of explanation. By viewing the three-lobed shape illustrated in FIG. 2, it should be apparent that roundness must not be confused with diameter. These two parameters are measured by different methods and with different instruments. To measure roundness, it is always necessary to rotate either the workpiece or the measuring instrument. Diameter is measured by determining the distance between a pair of parallel faces such as those of a micrometer.

To further illustrate the distinction between diameter and roundness, two diameters, 24 and 26, are shown as they would be measured between respective sets of parallel planes. Diameter 24 is measured between two parallel planes, 27 and 28. Diameter 26 is measured between two other parallel planes, 29 and 30. As can be seen, this type of diametric measurement in this three-lobed symmetrical shape, results in diameters 24 and 26 being measured as being generally equal. This result, by itself, does not indicate that the workpiece has a perfectly round shape as can be clearly seen in the illustration of FIG. 2. This result can be compared to a roundness measurement made in accordance with the procedure described above. Once a center point 22 is determined, radial measurements to a plurality of points on the periphery of the shaft can be made. Two of these points 32a and 32b are shown in FIG. 2. These points have different radial dimensions measured between each of them and the center point 22. The distance between the center 22 and point 32a is illustrated by radial line 34a and the distance between the center 22 and point 32b is shown by line 34b. In the case where these lines represent the minimum and maximum radial dimensions of the shape, the difference in magnitude between lines 34b and 34a represents the deviation from perfect roundness.

It can also be seen from FIG. 2 that a perfectly round shape can be achieved by selectively removing material from the deviation points, or lobes, where the outer periphery of the shape 40 deviates from the ideal perfect circle 20. By measuring the deviation at these lobes and selectively removing material from these lobes proportionate to the magnitude of the deviation, the present invention provides a means for achieving roundness in shapes which initially have deviations or lobes.

Figure 3:
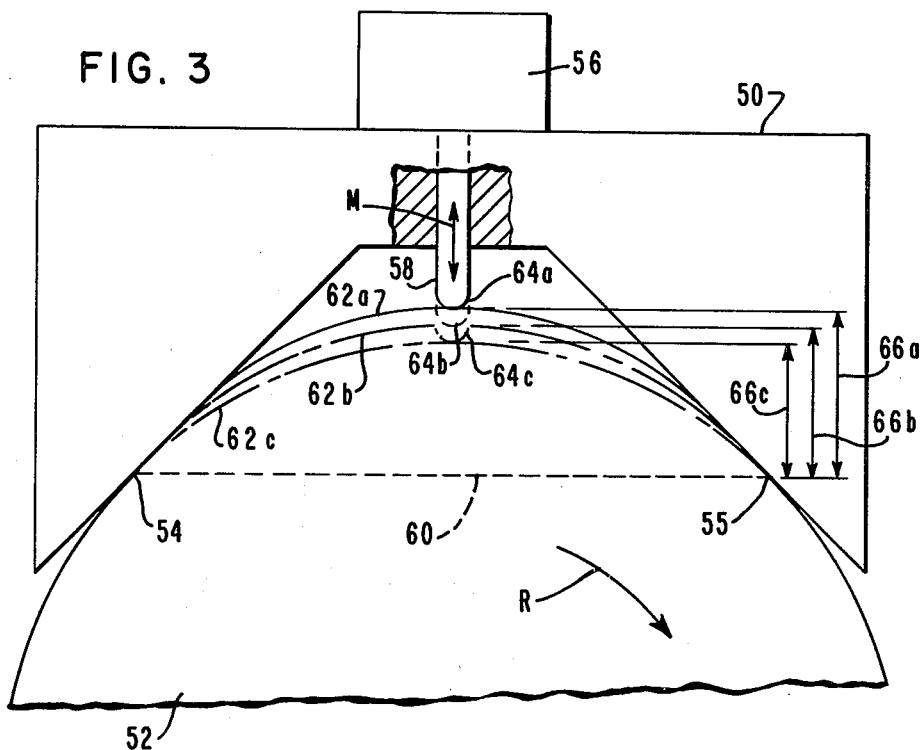
FIG. 3 illustrates the method of measurement utilized by the present invention.

FIG. 3 illustrates the concept used by the present invention in order to determine the magnitude of deviation from a perfect circle. The present invention incorporates a bracket member 50 which is shaped to have two-point sliding contact with a shaft 52. These two points of contact are illustrated in FIG. 3 by reference numerals 54 and 55. The bracket 50 supports a measuring device 56. The measuring device 56 utilizes a movable probe 58 which is permitted to move in the direction of arrow M which is generally in a direction along a radial line towards the center of the shaft 52.

The two points of contact, 54 and 55, between the bracket 50 and the shaft 52, describe a chordal line 60 therebetween. As the shaft 52 is rotated in the direction illustrated by arrow R, successive points along its surface are presented to the probe 58. For illustrative purposes, FIG. 3 illustrates the radial position of three successive points along the shaft's outer cylindrical surface. These surface positions are illustrated by reference numerals 62a–62c. As the rotation of the shaft 52 causes the surface portion 62a to pass under the probe 58, a point 64a on the shaft's surface passes directly under and in contact with the probe 58. By sensing the position of the probe 58, the measuring device 56 can determine the magnitude between the tip of the probe 58 and the chordal line 60 which is illustrated by dimensional arrow 66a. Of course, it should be apparent that in order to obtain a proper measurement for the value 66a, the apparatus must be calibrated in such a way that a value of zero would be obtained when the tip of the probe 58 is at the chordal line 60. It should be apparent to one skilled in the art that a calibration of this type is easily obtained.

As illustrated in FIG. 3, as the portion of the shaft's surface 62b passes, due to the shaft's rotation, under the measuring device, the tip of the probe 58 contacts surface 62b at point 64b, resulting in a measurement illustrated by the dimensional arrow 66b. Similarly, as the portion 62c of the cylindrical surface of the shaft 52 passes under the measuring device, point 64c is directly under the probe 58 and a measurement equivalent to the dimensional arrow 66c is received. FIG. 3 is intended to illustrate the basic concept by which a dimensional value for a deviation of a lobe can be measured as a shaft 52 rotates in sliding two-point contact with the bracket 50 of the present invention.

As the probe 58 moves in relation to the measuring device 56, an electrical signal is produced which is analogous to and representative of the distance between the chordal line 60 and the point of the shaft's surface which is in contact with probe 58. As these distances, which are represented by dimensional arrows 66a–66c, increase, the electrical signal from the measuring device 56 also increases so that a receiver of that signal could determine the magnitude of this measurement due to the analog nature of the signal itself.

This electrical signal is calibrated so that a minimal signal is output when the probe 58 is at a point indicating a surface with a minimal radial dimension and therefore the minimal deviation from a circle. This minimal radial position can be determined by rotating the shaft 52 through one complete rotation in the direction indicated by arrow R and, by observing the signals from the measuring device 56, determining the point on the shaft 52 for which the probe 58 reaches its maximum radially inward position.

Although not shown in FIG. 3, the measuring means 56 is also provided with a means for transmitting an electrical signal to another component of the present invention. This transmission means will be discussed in detail below. Measuring means of this type are known to those skilled in the art. An electronic gauge amplifier which is suitable for use in this type of application is amplifier model 599-1020 which is manufactured by the Brown and Sharpe Manufacturing Company. This model, or model 599-1021, used in conjunction with gauge head models of the 599 series, made by Brown and Sharpe Manufacturing Company, can provide appropriate electrical signals which are analogous to the measurements illustrated in FIG. 3 and described above. Although FIG. 3 is schematic in nature for purposes of simplicity, it should be understood that the probe 58 is analogous to the contact point of a standard gauge head and the measuring means 56 is analogous to the portion of standard gauge heads which provides the necessary mechanism, such as a coil and core combination, for transforming the mechanical movement of the contact point into proportional electrical analog signals. Although alternative types of gauge heads are applicable within the scope of the present invention, typical gauge heads contain two polar oriented coils plus a movable sintered iron core connected to the contact point of the gauge head. Movement of the contact point will cause corresponding movement of the core within the coils. This movement, in turn, influences the impedance of the coils with the output signal from the gauge head being zero when the core rests centrally within the two coils. If the probe 58 causes the core to shift within the coils, the impedance of one coil is reduced while that of the other is increased. The changing position of the core generates an electrical signal in exact proportion to the amount of axial displacement of the probe 58. This signal from the gauge head is then amplified, rectified, and potentially indicated on a DC meter. This amplified signal can also be used for other purposes. Measurement systems of this type permit precise measurements, even to the order of one millionth of an inch, to be made quickly and confidently. Although the above description of the gauge head and electronic gauge amplifier relates to equipment manufactured by the Brown and Sharpe Manufacturing Company, it should be understood that a rounding apparatus made in accordance with the present invention is not limited to these particular components.

Figure 4:
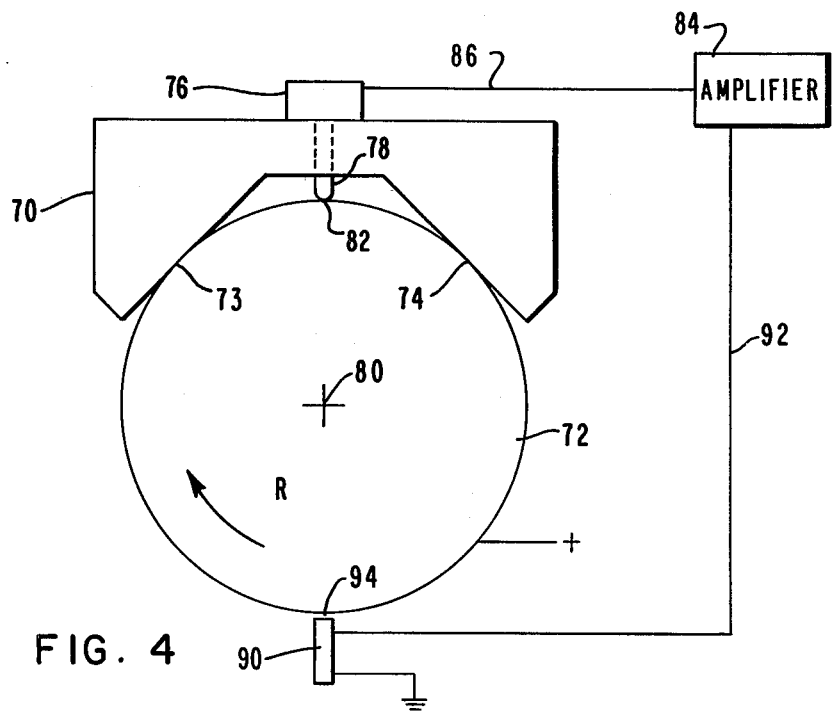
FIG. 4 shows an embodiment of the present invention associated with a generally circular shaft.

FIG. 4 shows a schematic diagram of the present invention which incorporates a bracket 70 which is shaped to provide a two-point sliding contact with a generally circular shaft 72. The two points of contact, 73 and 74, are shown in this two dimensional cross-sectional view as two distinct points. However, it should be understood that this contact between the bracket 70 and the shaft 72, if viewed in an axial rather than radial cross-section, would appear as lines of contact. This characteristic will be discussed in detail below. The bracket 70 supports a measuring means 76 which has a probe 78 attached thereto. The probe 78 is connected to the measuring means 76 in such a way that it has freedom of movement along a line which is generally radial to the shaft 72 and extends toward the center 80 of the shaft. Movement of the probe 78 causes the measuring means 76, which operates like the gauge head described above, to generate an electrical signal which is analogous to the position of the probe 78. Since the probe 78 is in contact with the surface of the shaft 72 at point 82, a radial movement of this surface area will cause the probe 78 to similarly move and the electrical signal which is generated and amplified will be representative of the radial position of cylindrical surface which is in contact with the probe 78. As the shaft 72 rotates in the direction indicated by the arrow R, a continuous succession of points will pass in contact with the probe 78 and cause the measuring means 76 to generate measurement signals. These signals can be transmitted from the measuring means 76 to an amplifier 84. This signal is passed between the measuring means 76 and the amplifier 84 along an electrical connection 86.

A shaft rounding apparatus made in accordance with the present invention incorporates a cathode 90 which is disposed proximate the shaft 72 in such a way so as to describe a gap between the shaft 72 and the cathode 90. By connecting the cathode 90 in electrical communication with the negative pole of a direct current source and connecting the shaft 72 in electrical communication with the positive pole of a direct current source, an electrical current can be caused to flow between the shaft 72 and the cathode 90 provided that a conductive environment is provided therebetween. By causing a flow of electrolyte to pass through the gap between the shaft 72 and the cathode 90, this electrical current path is provided. Furthermore, if the voltage of the cathode 90 is increased, the deplating of the portion of the shaft's surface which is most proximate the cathode 90 will be affected so as to increase the rate of metal removal from the shaft 72. Therefore, it should be apparent that a connection between the amplifier 84 and the cathode 90 can vary the voltage of the cathode 90 in such a way so as to vary the rate of metal removal from the shaft 72 at the point 94 on the shaft's surface which is most proximate the cathode 90. Electrical connection 92 provides this communication between the amplifier 84 and the cathode 90.

FIG. 4 illustrates the basic configuration of the present invention. However, it should be apparent that the point 82, where the probe 78 is in contact with the shaft 72, is displaced an arcuate distance from the point 94 which is most proximate the cathode 90. As the shaft 72 rotates in the direction indicated by the arrow R, point 82 will eventually replace point 94 as being the portion of the shaft's surface which is most proximate the cathode 90. If the present invention is configured in the way shown in FIG. 4, some means may be required that coordinates the measurement at point 82 to the deplating operation at point 94. This can be accomplished in at least two distinct ways. First, if the rotation of the shaft 72 is constant, a time delay can be utilized which holds the signal received on line 86 for a preselected period of time prior to amplifying it and sending the signal on line 92 to the cathode 90. The magnitude of this time delay is a function of the arcuate distance between points 82 and 94 along with the rate of speed of rotation of the shaft 72 in the direction indicated by the arrow R. Once determined, this time delay can be incorporated in the system shown in FIG. 4 in many ways known to those skilled in the art, such as utilizing a general purpose process control computer to read the signal from line 86 and output that signal to the amplifier 84 after the appropriate delay.

A second way to coordinate the activities of the probe 78 and the cathode 90 would be to equip the shaft 72 with a resolver which is capable of outputting a digital signal representative of its arcuate position at any instant of time. Resolvers of this type are known to those skilled in the art and output a signal which is analogous to an angular position measured from a reference position. At the time that the analog electrical signal is produced by the measuring means 76, the magnitude of that signal and the angular position of the shaft 72 can be read and stored. At the time that the shaft 72 is then in the position where that particular measured point is proximate the cathode 90, the electrical signal can be retrieved from storage and sent to an amplifier 84 followed by its transmission to the cathode 90 for purposes of causing a deplating at point 94. It should be understood that the present invention can be utilized in many modes. The effective operation of the present invention is not limited by the relative positions of the probe 78 and cathode 90. Therefore, it does not require a particular arcuate distance, or any at all, between these two particular components.

It should further be understood that, if the shaft 72 is known to have a two lobed roundness deviation with the lobes being symmetrical, the cathode 90 can be disposed at an arcuate distance from the measuring point 82 which is generally equal to 180° of rotation of the shaft 72. This positioning of the cathode 90 essentially places one lobe under the cathode 90 when a geometrically similar point on the other lobe is in contact with the probe 78. When the lobe which is in contact with the probe 78 is measured, its symmetrical probe is machined by the cathode 90. This method has been found to be satisfactory in rounding shafts which are known to have two symmetrical lobes. In this particular type of application, no additional position coordinating devices are required, such as the resolver or computer aided systems described above.

Figure 5:
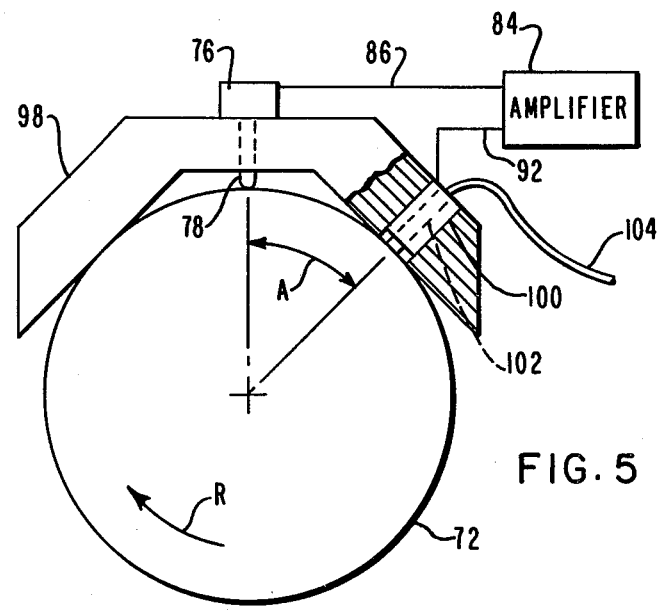
FIG. 5 shows an alternate embodiment of the present invention.

FIG. 5 illustrates an alternate embodiment of the present invention which contains all of the basic components illustrated in FIG. 4, but configures them in a slightly different manner. A bracket 98 is provided which is shaped to receive the shaft 72 in a sliding two-point relationship as shown. The bracket 98 is analogous to the bracket 70, which is illustrated in FIG. 4, but also provides a means for supporting a cathode 100. The cathode 100 is essentially the same as the cathode 90 of FIG. 4, but is shown in slightly greater detail to include an illustration of a central conduit 102 passing through its length and providing fluid communication between a gap which exists between the cathode 100 and the shaft 72 and a means for supplying the fluid electrolyte into the gap. This means for providing the electrolyte is shown as a hose 104, but it should be understood that the particular configuration of the hose 104 and conduit 102 are exemplary in nature and do not denote a required configuration of the present invention.

Also shown in FIG. 5 is the measuring means 76 along with its probe 78 which rests in contact with a portion of the cylindrical surface of the shaft 72. As described above, the measuring means 76 and probe 78 can be the gauge head of the standard measurement system. Also shown in FIG. 5 is an amplifier 84 along with lines, 86 and 92, for providing electrical communication between the measuring means 76 and the amplifier 84 and also between the amplifier 84 and the cathode 100. The operation of these components is essentially identical to that described above in conjunction with the configuration of FIG. 4. The difference between FIG. 5 and FIG. 4 is that the cathode 100 is incorporated as a portion of the bracket 98 and the cathode 100 is provided with a particular means for supplying an electrolyte fluid into the gap which exists between the cathode 100 and the shaft 72. One result of the disposition of the cathode 100 as part of the bracket 98 is that the probe 78 and the cathode 100 are placed in closer arcuate association with each other. The arcuate distance between these components, which is illustrated by arrow A, is clearly smaller than that which is represented by the configuration in FIG. 4. A comparison of FIGS. 4 and 5 illustrates that the relative arcuate positions of the probe 78 and the cathode 100 is not a critical element of the present invention.

It should be understood that the configuration illustrated in FIG. 5 requires that the cathode 100 be prevented from having direct electrical contact with the shaft 72. Similarly, the cathode 100 should not be in electrical communication with the bracket 98 since that would provide an alternate path for the electric current between the shaft 72 and the cathode 100. This can be easily accomplished by disposing the cathode 100 in an insulative sleeve which prevents electrical communication between it and the bracket 98 and also by disposing the cathode 100 a preselected distance from the cylindrical outer surface of the shaft 72 so as to provide the gap described above.

Although the configuration illustrated in FIG. 5 can be associated with some means that enables the system to delay the signal received from the measuring means 76 for an appropriate period of time until the measured point passes under the cathode 100, it has been found that this coordinating means is not required in most three lobe systems. Instead, the signal received from the measuring means 76 is inverted prior to its being amplified and sent to the cathode 100. This inversion essentially causes the apparatus shown in FIG. 5 to machine a high point which is proximate to cathode 100 in response to the measurement of a low point under the probe 78. In the machining of shafts which exhibit shapes amenable to this type of operation, it has been found that acceptable roundness can be achieved by this inverted signal approach. As the shaft 72 rotates in the direction illustrated by the arrow R, a high point which passes directly under the cathode 100 causes the bracket 98 to move in such a way so as to raise the measuring means 76 away from the shaft 72. This movement is accompanied by an extension of the probe 78 away from the measuring means 76 in order that contact be maintained between the probe 78 and the surface of the shaft 72. This movement of the bracket 98 which is caused by the lobe passing under the cathode 100 essentially appears as a low point under the probe 78 and an appropriate signal is generated. If this signal is inverted and calibrated to a proper bias value, the voltage supplied on line 92 from the amplifier 84 will deplate an appropriate amount of material from the lobe and roundness of the shaft 72 will be achieved.

Figure 6:
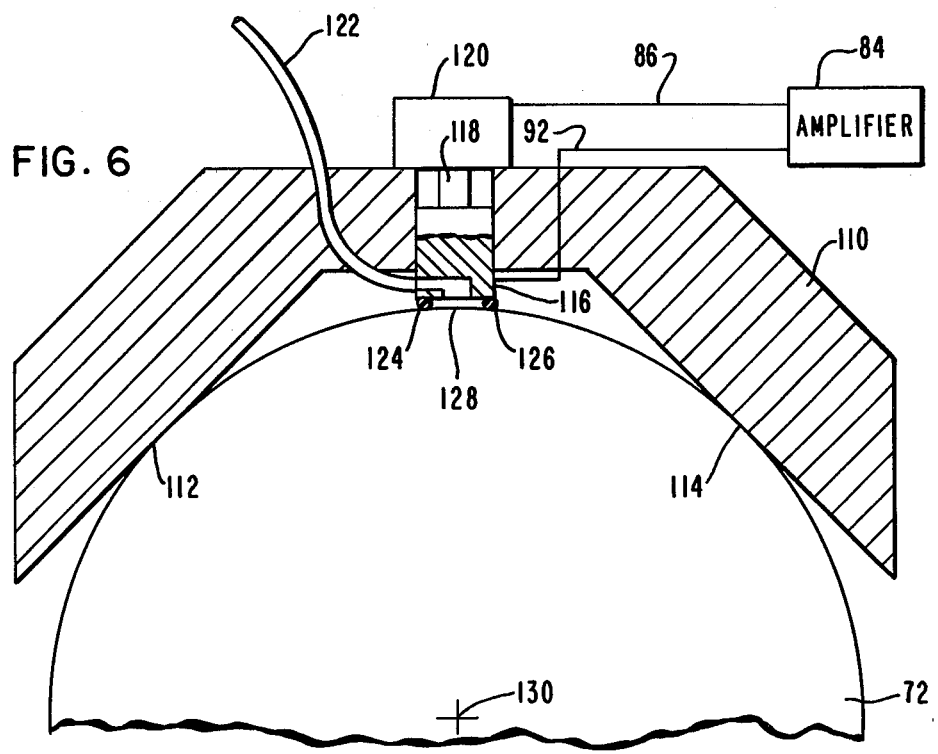
FIG. 6 shows another alternate embodiment of the present invention.

FIG. 6 illustrates a configuration of the present invention which provides for the cathode to be placed at the same arcuate position as the probe of the measuring device. As in the discussions above, a bracket 110 is provided which is shaped to receive a shaft 72 in two-point sliding association. The two points of contact are illustrated by reference numerals 112 and 114. The cathode 116 is placed directly in line with the probe 118 of the measuring device 120. In the configuration illustrated in FIG. 6, the cathode 116 is connected directly to the probe 118 and these two components are associated with the bracket 110 in such a way that they can move back and forth in a direction which is generally parallel to a radius of the shaft 72.

The cathode 116 is provided with a conduit 122 which enables a stream of electrolyte to flow into the gap between the cathode 116 and the shaft 72. The cathode 116 is also provided with means for supporting it in sliding contact above the surface of the shaft 72. This supporting means is illustrated as two insulative pieces, 124 and 126, which are dimensioned in such a way so as to provide a constant gap between the cathode 116 and a point 128 on the cylindrical surface of the shaft 72. The measuring means 120, as discussed above, sends an electrical signal on line 86 to the amplifier 84. The amplifier 84, in turn, sends an amplified signal to the cathode 116 along line 92. When a high point, or deviation, passes directly under the cathode 116, the cathode is moved in a direction away from the center 130 of the shaft 72. This movement of the cathode 116 causes the probe 118 to move in a direction toward the measuring means 120 and causes an appropriate signal to be sent on line 86 to the amplifier 84. The amplified signal is then sent to the cathode 116 and the rate of electrochemical machining is increased. In other words, the negative voltage of the cathode 116 is in direct relationship to its distance from the center 130 of the shaft 72. Therefore, it should be apparent that, as the shaft 72 is rotated in such a way so as to pass a sequence of points on its surface under the cathode 116, these points will be selectively deplated at a rate of metal removal which is directly proportional to the amount of metal that must be removed from that point in order to achieve a round shaft 72.

In all of the configurations described above, it should be understood that the cathode of the present invention is always connected in electrical communication to the negative pole of a direct current power supply and the workpiece, such as the shaft, is always connected in electrical communication to the positive pole of a direct current power supply. Furthermore, the cathode of the present invention is always provided with an insulative barrier in order to prevent any electrical communication between it and the shaft other than a current flow passing through the electrolyte in the gap which exists between these two components.

Figure 7:
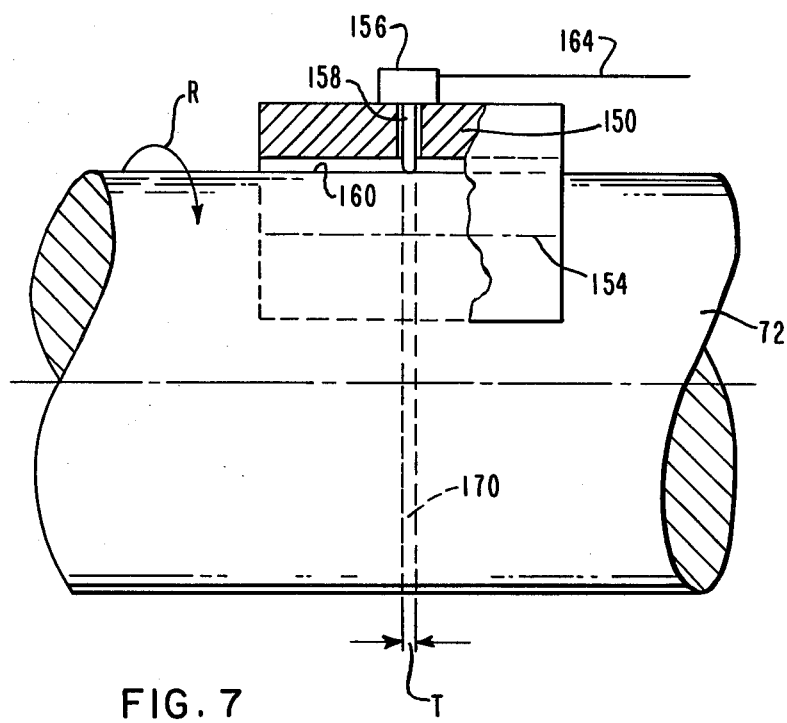
FIG. 7 illustrates a side view of the present invention associated with a shaft.

FIG. 7 illustrates an axial view of the present invention. The purpose of FIG. 7 is to particularly illustrate the fact that, although the present invention has been described herein as being in slidable two-point contact with the shaft, this contact is actually a linear contact when observed in an axial view. In FIG. 7, a shaft 72 is provided with a means to rotate it in the direction illustrated by arrow R. A bracket 150 is shaped to provide contact with the shaft as described above. In the view of FIG. 7, one of these contacts is along an axial line 154. However, it should be apparent that if the illustration in FIG. 7 was drawn in a radial cross-sectional view, the line of contact 154 would be represented by a single point as illustrated in the prior figures. The bracket 150 supports a measuring means 156 which has a probe 158 extending therefrom. The probe 158 is in contact with a cylindrical surface 160 of the shaft 72. When the dimension between the cylindrical surface 160 under the probe 158 and the line of contact 154 changes, an analogous electrical signal is produced by the measuring means 156 and output to another component, such as an amplifier, on line 164.

As the shaft 72 rotates about its center line in the direction illustrated by the arrow R, the probe 158 is placed in contact with a succession of points around the periphery of the rotor 72. Depending upon the diameter of the probe 158, these successive points will describe a band 170 of thickness T which passes circumferentially around the shaft 72. Therefore, it is apparent that in order to adequately machine the shaft 72, the bracket 150 along with its attached components must also be moved in an axial direction to provide the desired area coverage.

It should be understood that throughout the description of the present invention different reference numerals have been utilized to designate functionally similar components. For example, reference numerals 50, 70, 98, 110 and 150 have been used to refer to the bracket which is shaped to provide two point contact with the shaft 72. These different reference numerals have been used to distinguish among fuctionally identical brackets which are of slightly different configurations in order to have the characteristics required for different alternate embodiments of the present invention. Similarly, reference numerals 90, 100 and 116 have been used to designate cathodes of the present invention. These cathodes all function identically in that they cause material to be removed from the shaft 72. Their differences relate to functional adaptations including means for providing a constant flow of electrolyte fluid to their gaps and means for positioning the cathode a predetermined distance from the surface of the shaft. In viewing the Figures in conjunction with the above disclosure, it should be understood that FIGS. 4, 5 and 6 each represent the present invention in different embodiments. FIG. 4 shows the present invention with the cathode displaced 180° from the measuring probe, such as would be applicable to machine to load shafts, FIG. 5 shows the cathode incorporated as a part of the bracket and FIG. 6 illustrates the cathodes being connected to the probe of the measuring device in such a way that a point on the shaft's surface can be machined instantaneously as it is measured. FIG. 3 is intended to illustrate the measuring technique employed by the present invention and FIG. 7 is intended to illustrate an axial view of the present invention associated with a shaft in order that a proper perspective be provided. FIGS. 1 and 2 illustrate the basic fundamentals of roundness measurements and lay the ground work for a geometric explanation of the way the present invention works.

The present invention provides a means for improving the roundness characteristic of a shaft in such a way that the cathode of an electrochemical machining apparatus is placed at a voltage potential relative to the shaft which corresponds to a measurement made by a measuring means which indicative of the magnitude of deviation of a particular point on the shaft from a perfect circle. It should be understood that, although the present invention has been described herein with a high degree of specificity, it should not be considered to be so limited.

What I claim is:

1. Shaft machining apparatus, comprising;
a bracket shaped to slidably contact a shaft at two points, said two points being separated by a preselected arcuate distance on said shaft, said two points being at generally equivalent axial positions on said shaft, said two points defining a chordal line through said shaft;
means for measuring the distance between a preselected point on the surface of said shaft and said chordal line;
means for rotating said shaft relative to said bracket;
means for creating an electrical signal which is analogous to said distance between said preselected point and said chordal line; and
means for electrochemically removing material from said shaft at said preselected point, said removing means acting in response to said analogous electrical signal and comprising a cathode disposed a predetermined distance from said surface of said shaft and a means for causing a fluid electrolyte to flow between said cathode and said surface of said shaft, said cathode being connected to an electrically negative source, said shaft being connected to an electrically positive source.

2. The apparatus of claim 1, wherein:
said analogous electrical signal represents a change in said distance between said preselected point on said shaft and said chordal line compared to a predetermined setpoint distance.

3. The apparatus of claim 1, wherein:
said removing means is disposed proximate said measuring means.

4. The apparatus of claim 1, wherein:
said removing means is displaced a preselected arcuate distance from said measuring means.

5. The apparatus of claim 4, further comprising:
means for coordinating the activation of said removing means to the rotation of said shaft.

6. The apparatus of claim 5, wherein:
said coordinating means comprises a digital resolver attached to said shaft.

7. The apparatus of claim 4, further comprising:
means for coordinating the activation of said removing means to the operation of said measuring means, said coordinating means being adapted to store said electrical signal for a period of time before activating said removing means, said period of time being determined from said predetermined arcuate distance and the rotation of said shaft.

8. The apparatus of claim 1, further comprising;
means for moving said bracket axially relative to said shaft.

* * * * *